United States Patent
Harris

(10) Patent No.: US 6,473,104 B1
(45) Date of Patent: Oct. 29, 2002

(54) SLIDER CONTROL

(75) Inventor: Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,290

(22) Filed: Aug. 4, 1999

(30) Foreign Application Priority Data

Aug. 22, 1998 (GB) ............................................. 9818284

(51) Int. Cl.⁷ ................................................. G06F 3/14
(52) U.S. Cl. ...................... 345/833; 345/781; 345/764; 345/786; 345/787
(58) Field of Search ................................. 345/781, 764, 345/833, 784, 786, 787; 707/526, 527, 530

(56) References Cited

U.S. PATENT DOCUMENTS

| | | | | | |
|---|---|---|---|---|---|
| 5,339,391 A | * | 8/1994 | Wroblewski et al. | ....... | 395/341 |
| 5,506,951 A | * | 4/1996 | Ishikawa | ..................... | 395/341 |
| 5,867,678 A | * | 2/1999 | Amro et al. | ................. | 345/347 |
| 5,874,961 A | * | 2/1999 | Bates et al. | ................. | 345/341 |
| 5,903,267 A | * | 5/1999 | Fisher | ........................ | 345/341 |
| 5,973,663 A | * | 10/1999 | Bates et al. | ................. | 345/123 |

\* cited by examiner

*Primary Examiner*—John Cabeca
*Assistant Examiner*—Thomas T. Nguyen
(74) *Attorney, Agent, or Firm*—Roy W. Truelson; Leslie J. Payne

(57) ABSTRACT

A slider control cooperates with a viewport of a graphic user interface interactive application in which information is displayed. The invention is applicable where this information is divisible into a series of information vectors of varying lengths, at least some of which are longer than the length of the viewport in a direction parallel to said vectors. The slider control according to the invention is adapted to display the degree to which these vectors exceed said viewport length.

6 Claims, 7 Drawing Sheets

Invention Number 501286

Page Contents

* Invention Title
* Key Ideas
* Claims
* Embodiment
* General Information
* Inventors Listing
* Invention Development Team Listing
* Mandatory Questions and Answers
* Optional Questions and Answers
* Decision Information

FIG. 2A

Invention Number 501286

Page Contents

* Invention Title
* Key Ideas

FIG. 2B

- Invention Title
- Key Ideas
- Claims
- Embodiment
- General Information
- Inventors Listing
- Invention Development Team Listing
- Mandatory Questions and Answers
- Optional Questions and Answers
- Decision Information

```
This is a short line

This is a bit longer, normal size

This is a line which is going to be a long line, very long

This is a short line
This is a bit longer, normal size
This is a line which is going to
111111111
2222222222222222222222
33333333333333333333
4444444444444444444444
55555555
6666666666666666666666
7777777777777777

SLIDER CONTROL

FIELD OF THE INVENTION

This invention relates to a slider control for a graphic user interface (GUI) desktop (such as that provided by Windows/95/98/NT produced by Microsoft Corporation or OS/2 produced by IBM Corporation) or for any GUI based display (such as that provided within a Browser, whether Java enabled or not).

BACKGROUND OF THE INVENTION

FIG. 1 illustrates a window frame 10 including two conventional slider controls, a vertical one 11 on the right hand side (RHS) of the window and a horizontal one 12 running along: the bottom of the window. Each slider has an end-point 13 at each end (shown by the arrows) and a bar 14 which indicates the position of the slider control and its relative value.

One usage of a slider control is for scroll bars. Scroll bars are slider controls which are nested within an owning window to map viewports, areas smaller than the size of a larger window within which the larger window is partially display ed. The displayed window and its scroll bars all have handles associated with them. The handle of the owning window is obtained upon creation from a desktop manager, the component of an operating system for controlling the desktop display. When each scroll bar is created, the creation is done upon the handle of the owning window (the window that is going to contain the slider) and a handle returned. Thus, there is a handle hierarchy where the process owning the window handle knows about the handle for both the vertical and horizontal scroll bars.

A slider/scroll bar is manipulated by the user by clicking on the end arrows 13 or moving the slider bar 14 by mouse or keyboard interaction. By convention, a click on an end arrow moves the bar one position in the required direction. The slider bar 14 moves in increments that can be specified at run time. When the slider control is being used as a scroll bar, an event indicating movement of the slider (by keyboard or mouse click on the end arrows or by the mouse moving the bar etc.) is sent to the window owning process which repositions the viewport according to the current position of the bar in the slider.

In a Microsoft operating system environment, a slider is implemented as a window (which is why it has a handle) containing optional tick marks. A tick mark corresponds to a position of the bar in the slider, and hence the value of the slider. The value of the slider control (or the position of the slider bar) is the current tick mark at which the bar is positioned.

The properties of the slider control can be altered including setting the maximum and minimum settings for the slider (the top/bottom or left/right values), setting and displaying the tick marks, setting the number of tick marks that the bar 14 covers (by default, one), setting the number of tick marks by which a press on the end arrows moves the bar (by default, one tick mark incremented or decremented according to down/right or up/left) and positioning the bar (setting the value of the slider control).

When a slider control is used as a scroll bar, the value of the slider—the position of the bar—is used to control the viewport. So, a large window could contain the information shown in FIG. 2(a), and in a smaller window a slider could be used as a scroll bar to position a viewport upon this larger display as shown in FIG. 2(b), and by moving the bar, a different piece of the underlying data can be shown in the viewport, as shown in FIG. 2(c).

Consider now a slider used as a scroll bar in a GUI-based editor. When such sliders operate as scroll bars when editing or viewing a large document through a viewport, the vertical scroll bar positions the viewport on a line basis, whilst an horizontal scroll bar positions the viewport within the contents of lines. When editing text lines in a GUI-based editor, the viewport shows the current area of the file being changed.

A problem exists for a user who wants to add or view characters at the end of a line, in that it is difficult to know whether it is more convenient, easier or logically better to scroll using the keyboard one character at a time, or to reposition the viewport with the mouse, or use the keyboard to position the viewport at the end of the current line. All these operational methods have their advantages and disadvantages, but the one to use depends on the current context.

Thus, if a user needs only to move the viewport slightly, it may be better to use the keyboard than to take the trouble of grabbing the mouse, positioning it on the arrow part of the scroll bar and clicking.

It should also be noted that when editing a file and altering a single line in a GUI-enabled editor, the horizontal scroll bar shows the position of the viewport relative to the longest line in the file. There is no information available as to the length of the current line. Consequently, there is no way of deducing whether use of right arrow, the End key, a click on the right arrow of the horizontal scroll bar or moving the bar on the horizontal scroll bar is the best way of, say, getting to the end of the line in order to append or view characters.

The intuitive action of pressing the End key (assuming it is implemented to go to the end of the line within the editor program) may not exhibit the behaviour required, as this will reposition the viewport in a manner that may not be required by the user (such as aligning the RHS of the viewport 10 characters to the right of the last character on the line, or putting the viewport boundary exactly at the end point of the line etc.).

The present invention addresses this difficulty, primarily with vertical scroll bars, and mitigates the problem by providing a slider control with additional properties.

DISCLOSURE OF THE INVENTION

Accordingly, the present invention provides a slider control component for a graphic user interface cooperable with a viewport of a graphic user interface interactive application in which information is displayed, said information being divisible into a series of information vectors of varying lengths, at least some of which are longer than the length of the viewport in a direction parallel to said vectors, said slider control being adapted for display orthogonally to said vectors and being adapted to display the degree to which these vectors exceed said viewport length.

BRIEF DESCRIPTION OF THE DRAWINGS

Embodiments of the invention will now be described with reference to the accompanying drawings, in which:

FIGS. 2(a)–(c) show the operation of a viewport;

FIG. 3(a) shows source text to be displayed;

DESCRIPTION OF THE PREFERRED EMBODIMENTS

Figure 1:
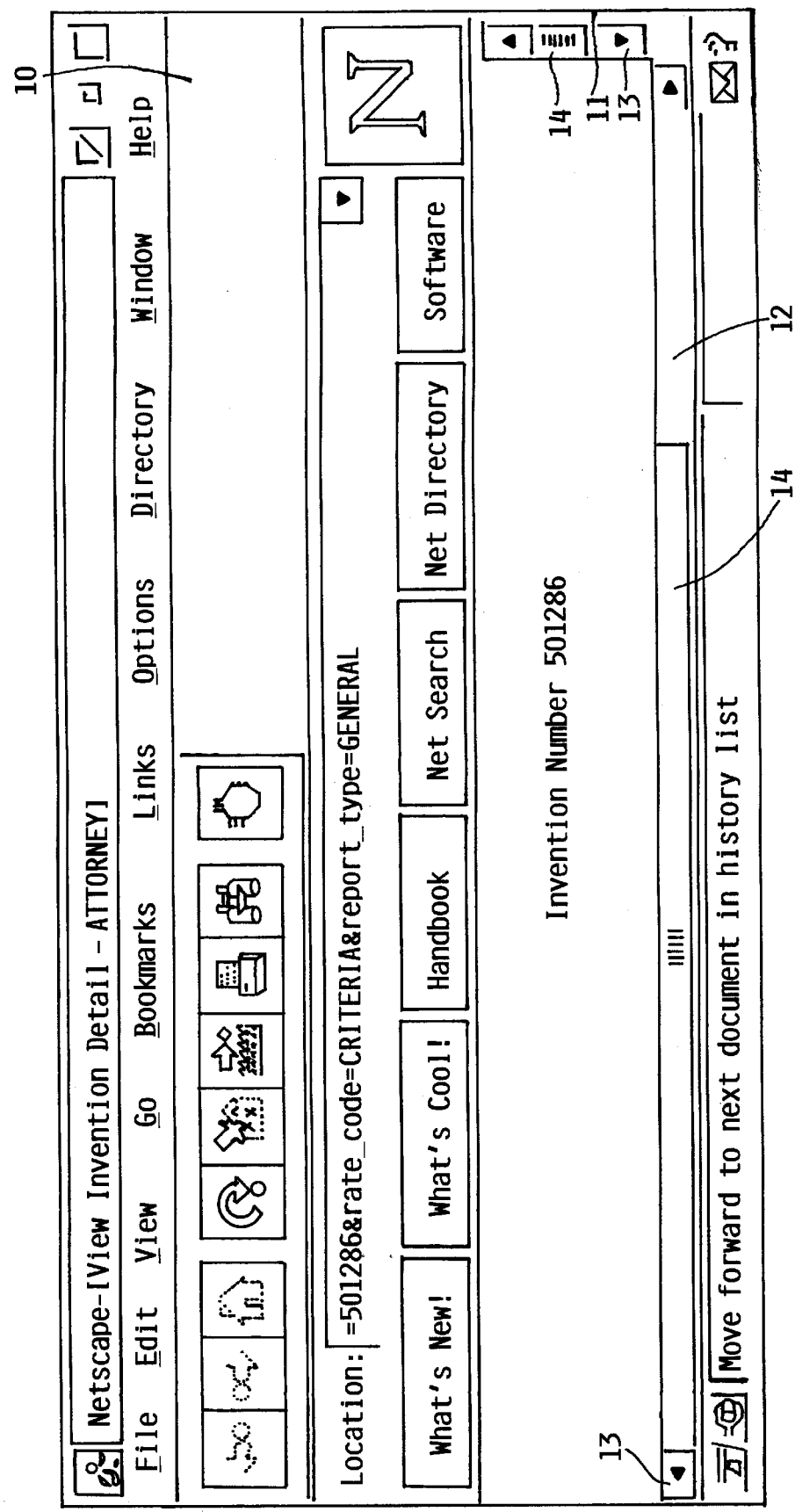
FIG. 1 shows a window including conventional slider bars.
Figure 2C:
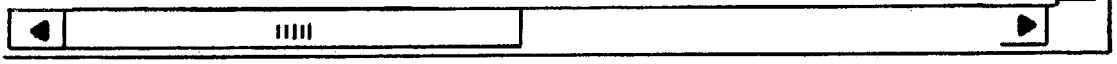

One can think of the information to be displayed within a viewport as being divided into a series of horizontal vectors (lines) and a transverse series of vertical vectors (columns). In an editor the horizontal vectors, each corresponding to a line of text, usually vary in length while the vertical vectors have a constant length, the number of lines in the document. Thus, in general, the problem with vertical scroll bars does not occur when moving down lines of a file in an editor, because the vertical position of the viewport over the whole of the file is not affected by variable lengths of lines. As far as the vertical scroll bar is concerned, all entries are of the same length (you cannot have a partial line with holes in it). Nonetheless, the present invention remains applicable to horizontal slider controls where there is a need to determine individual column length within a viewport.

The invention provides a slider control for a viewport in which information is displayed. The information is divisible into a series of information vectors of varying lengths, at least some of whom are longer than the length of the viewport in a direction parallel to these vectors. The slider control is displayed orthogonally to these vectors and is adapted to display the degree to which these vectors exceed this length of the viewport.

The preferred embodiment conveys this excess length information by varying the width of the vertical slider/scroll bar depending upon the length of the horizontal items currently visible within the viewport. By this means, the properties of the current lines within the viewport are indicated, so giving the user the information required to move the viewport in a considered fashion. Although the slider properties discussed below are suitable for sliders implemented as vertical scroll bars for moving viewports, the principals are applicable to horizontally placed sliders and scroll bars.

The embodiment enables information to be conveyed within a slider by varying the width of the control according to the length (or any desired property) of the items currently visible or partially visible within the viewport (indirectly) controlled by the slider. Using the present embodiment, a vertical slider bar displays information relating to the horizontal property of the lines within the viewport (and an horizontal slider displays information relating to the vertical properties). The width of the slider is varied in a direction away from the side of the control adjacent the viewport (in an editor window, a vertical slider on the RHS of the viewport has its RHS as a ragged edge) to convey the desired information. This emphasises that the degree of raggedness relates to the lines in the current viewport, not the whole file, so the raggedness alters as the slider bar is moved through any interaction with the slider control.

Preferably, the width of the bar 14 on the slider control varies its width, as it overlays part of the scroll bar, and so takes its outline to be that part of the ragged edge which it is overlaying.

Figure 3B:
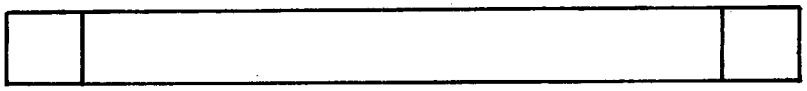
FIG. 3(b) shows the source text of FIG. 3(a) displayed conventionally.
Figure 3B:

To illustrate the preferred embodiment, consider the editing of a file by a GUI enabled editor. The lines in the file, for simplicity, are classified as Short, Normal or Long. Taking the input information as shown in FIG. 3(a), when the editor window is small, the viewport can use conventional 'scroll bars to control its position in the larger file, as shown in FIG. 3(b).

Figure 3C:
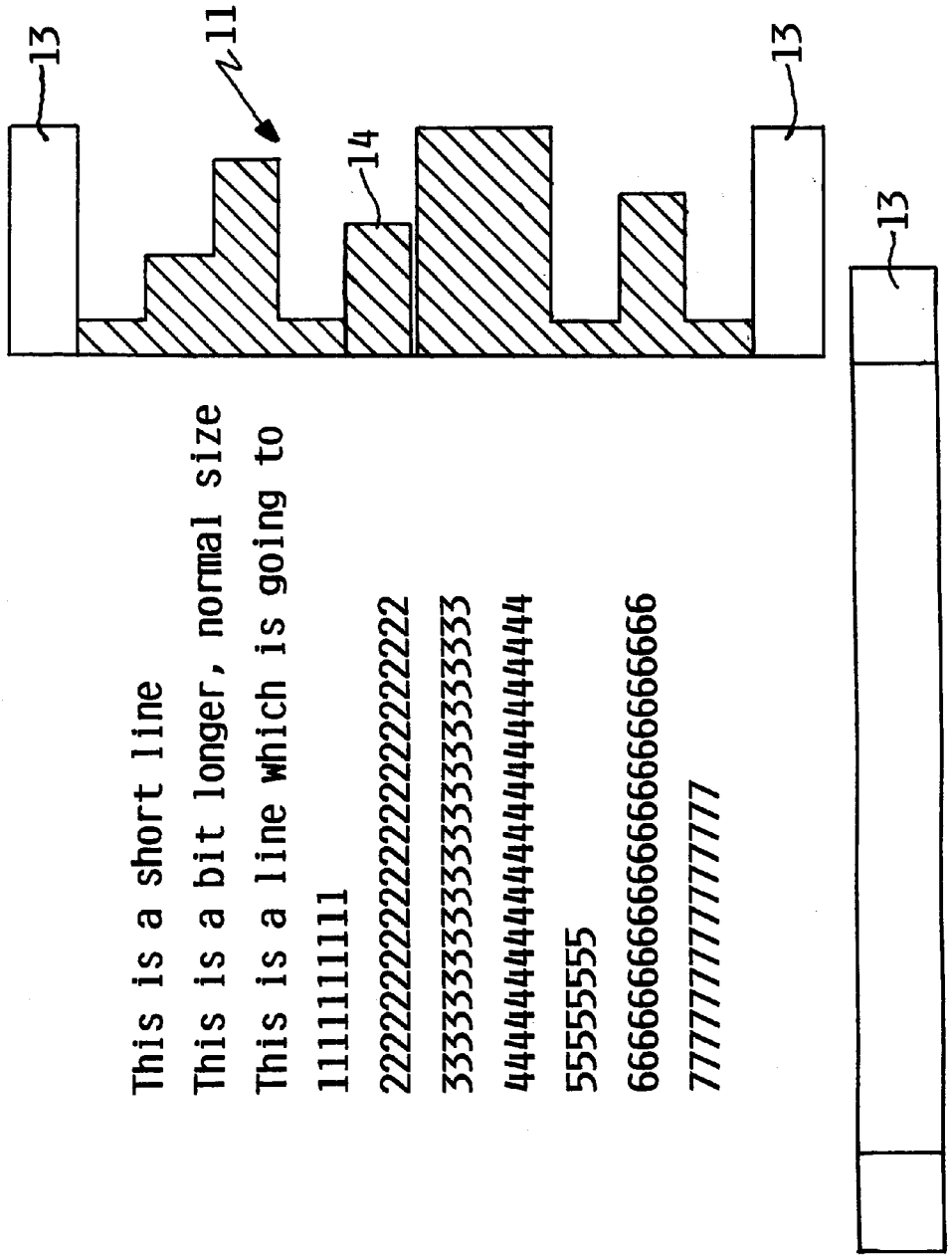
FIG. 3(c) shows the source text of FIG. 3(a) displayed using a slider control according to the invention.

The preferred embodiment of the invention provides that the width of the vertical scroll bar 11' varies according to the length of the lines in the current viewport as shown in FIG. 3(c).

Consequently, the user knows that the line "2222222" is of medium size, so to go to the end of it cursor movement is probably the best method as the viewport will not move. However, the line "4444444" is shown as a long one, so the End key which moves the viewport is the best method of editing the line.

The width of the vertical slider control according to the embodiment is controlled through application program interface (API) calls that operate upon a tick-mark basis. Each Tick Mark (which is the granularity of the slider control) has an associated width setting. This setting is then used by the GUI to vary the width of the scroll bar accordingly. The following API is presented in Object Oriented terms, whereby the instantiated object is a vertical slider control (of which a scroll bar is a special instance):

SetMinimumTickwidth(i)
    Set the lower boundary for width processing. Any tick width lower than i is to be treated as i for display purposes i=GetMinimumTickwidth( )
    Return value set above SetMaximumTickWidth(i)
    Set the upper boundary for width processing. Any tick width larger than i is to be treated as i for display purposes i=GetMaximumTickWidth( )
    Return value set above SetTickWidthGranularity(i)
    Set the width increments to ticks. The interval between the:Minimum and Maximum tick widths is to be divided into i blocks for display purposes. This governs the degree of raggedness of the slider.

i=GetTickwidthGranularity( )
    Return value set above

SetTickWidth(t,w)
    Set the width of tick t to be i. This sets the ragged edge of the slider.

w=GetTickWidth.(t)
    Return value set above for the given tick t.

SetDefaultTickwidth(i)
    Set the initial width for all tick marks (holds until width explicitly set)

i=GetDefaultTickWidth( )
    Return value set above

EnableTickWidth( )
    Show the slider in ragged format

DisableTickWidth( )
    Show the slider with a straight edge (default)

t=QueryTickwidthProcessing( )
    Queries the current ragged/straight status of the slider: returns TRUE if a ragged processing is enabled, FALSE if straight edge processing is active (or ragged edge processing is not supported)

t=QueryTickWidthSupported( )
    Queries whether the current slider supports ragged edge processing: returns TRUE if a ragged processing is permitted, FALSE if only straight edge processing is active.

Other methods to do with setting the maximum width of the slider control in desktop measurements are not needed as they are covered by the dimensions of the slider when it is created.

Although the API above relates to length information, the invention can also be used for applications where other information, that can be reduced to a numerical property on a per line, or conversely column, basis is provided within a viewport.

It will be seen that to apply the invention to a horizontal slider control, the API above usage of Tick width is interpreted as applying to the depth of the Slider.

In a variation of the preferred embodiment, the blocks of varying thickness of the first embodiment are replaced by a slider whose colour or shading varies according to the length of the underlying vector crossing the slider. In the case of a vertical slider, this may be a line of text, or in the case of an horizontal slider, the depth of an underlying column. In this embodiment, it will be seen that the TickWidth based API of the first embodiment needs to be replaced by an API for getting and setting individual tick colour or grey level; as well as getting and setting tick colour or grey scale maxima, minima and granularity of colour or grey scale variations according to the length of information vector underlying a slider control. Such an embodiment has the advantage that the slider, bar can be of relatively narrow and constant width/depth, although it does have the disadvantage of relying on the user to accurately relate the tick colour/grey scale to the correct line/column of the viewport.

It will also be seen that because the API according to the preferred embodiment only adds method calls to enhance the operation of a conventional slider control, the slider control of the preferred embodiment can be substituted for a conventional slider control, without requiring any changes to existing applications. Applications written for the enhanced slider control can simply check whether QueryTickWidthSupported( ), or its equivalents, returns true or not to determine if an enhanced slider control is available or not. If so they can undertake the overhead of maintaining tick values for display by the slider control, or if not, they can operate as normal.

What is claimed is:

1. A slider control cooperable with a viewport of a graphic user interface interactive application in which information is displayed, said information being divisible into a series of information vectors of varying lengths, at least some of which are longer than the length of the viewport in a direction parallel to said vectors, said slider control being adapted for display orthogonally to said vectors and being adapted to display the degree to which these vectors exceed said viewport length said slider control display is divisible into a plurality of sections each associated with one or more vectors displayed within said viewport; said application is a text editor, said slider is a vertical scroll bar and said vectors are lines of text.

2. A slider control as claimed in claim 1 in which each section is associated with one vector.

3. A computer program product comprising computer readable code stored on a storage medium for, when executed on a computer, controlling the display of a slider control, the product comprising a slider control as claimed in claim 1.

4. A slider control cooperable with a viewport of a graphic user interface interactive application in which information is displayed, said information being divisible into a series of information vectors of varying lengths, at least some of which are longer than the length of the viewport in a direction parallel to said vectors, said slider control being adapted for display orthogonally to said vectors and being adapted to display the degree to which these vectors exceed said viewport length; said slider control display is divisible into a plurality of sections each associated with one or more vectors displayed within said viewport; said slider is a slider control and said vectors are columns having respective depths; each of said sections is displayed with a width corresponding to the degree to which its associated vector exceeds said viewport length.

5. A slider control cooperable with a viewport of a graphic user interface interactive application in which information is displayed, said information being divisible into a series of information vectors of varying lengths, at least some of which are longer than the length of the viewport in a direction parallel to said vectors, said slider control being adapted for display orthogonally to said vectors and being adapted to display the degree to which these vectors exceed said viewport length; said slider control display is divisible into a plurality of sections each associated with one or more vectors displayed within said viewport; said slider is a slider control and said vectors are columns having respective depths; wherein each of said sections is displayed with a colour corresponding to the degree to which its associated vector exceeds said viewport length.

6. A slider control cooperable with a viewport of a graphic user interface interactive application in which information is displayed, said inforrnation being divisible into a series of information vectors of varying lengths, at least some of which are longer than the length of the viewport in a direction parallel to said vectors, said slider control being adapted for display orthogonally to said vectors and being adapted to display the degree to which these vectors exceed said viewport length; said slider control display is divisible into a plurality of sections each associated with one or more vectors displayed within said viewport; said slider is a slider control and said vectors are columns having respective depths; each of said sections is displayed with a grey scale value corresponding to the degree to which its associated vector exceeds said viewport length.

* * * * *